United States Patent [19]

Burley

[11] 4,429,669

[45] Feb. 7, 1984

[54] VALVED PRECHAMBER DIESEL ENGINE AND METHOD OF OPERATING

[75] Inventor: Harvey A. Burley, Rochester, Mich.

[73] Assignee: General Motors Corporation, Detroit, Mich.

[21] Appl. No.: 346,868

[22] Filed: Feb. 8, 1982

[51] Int. Cl.³ .......................... F02B 19/02; F02B 75/02
[52] U.S. Cl. .................................. 123/179 H; 123/64; 123/292
[58] Field of Search .............. 123/179 F, 179 R, 292, 123/316, 64

[56] References Cited

U.S. PATENT DOCUMENTS

| | | | |
|---|---|---|---|
| 3,785,355 | 1/1974 | Toepel | 123/316 X |
| 3,929,107 | 12/1975 | Renger | 123/292 |
| 3,996,912 | 12/1976 | Dreisin et al. | 123/179 H |
| 4,191,152 | 3/1980 | Deutschmann | 123/179 R X |
| 4,223,645 | 9/1980 | Nohira et al. | 123/292 |
| 4,289,097 | 9/1981 | Ward | 123/292 |

Primary Examiner—Tony M. Argenbright
Attorney, Agent, or Firm—Robert J. Outland

[57] ABSTRACT

A prechamber type diesel engine is provided with a cutoff valve in the throat connecting the prechamber and main chamber of each cylinder and operable in cyclically timed fashion to close and open communication between these chambers. Methods of engine operation are disclosed which utilize the cutoff valve to (1) trap combustion products in the prechamber from the previous expansion stroke for use in mixing with the fresh charge in the following compression stroke to provide internal EGR preferably stratified in the prechamber and (2) permit low compression ratio starting by trapping compression pressure in the prechamber from a previous compression stroke for addition to combustion chamber pressure developed on the following compression stroke to provide a higher cylinder pressure for starting than that provided by the overall compression ratio. Advantages of improved engine efficiency and reduced emission levels are anticipated.

3 Claims, 5 Drawing Figures

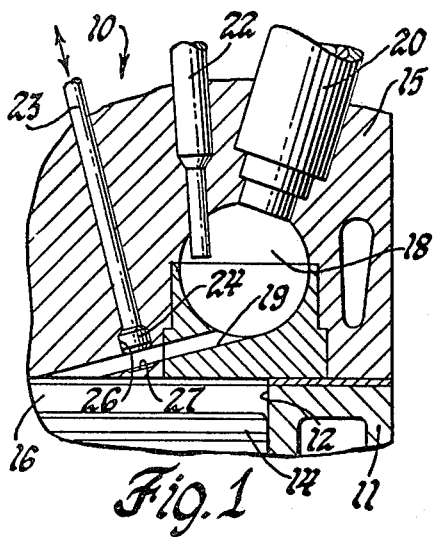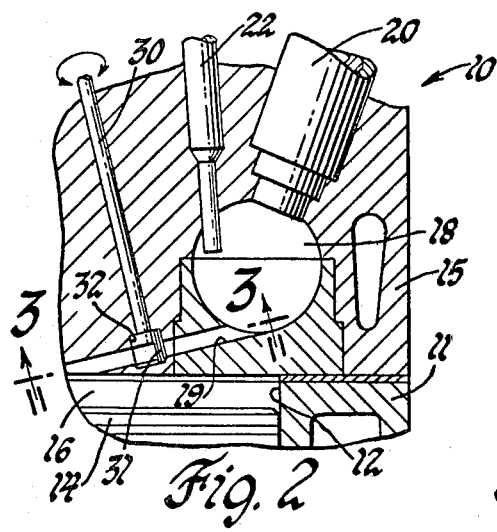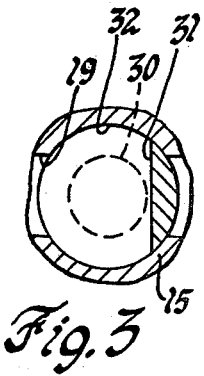
Fig. 1  Fig. 2  Fig. 3
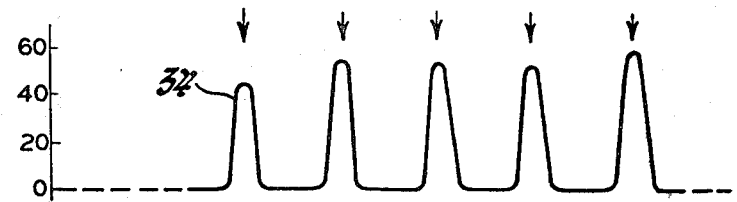
Fig. 4
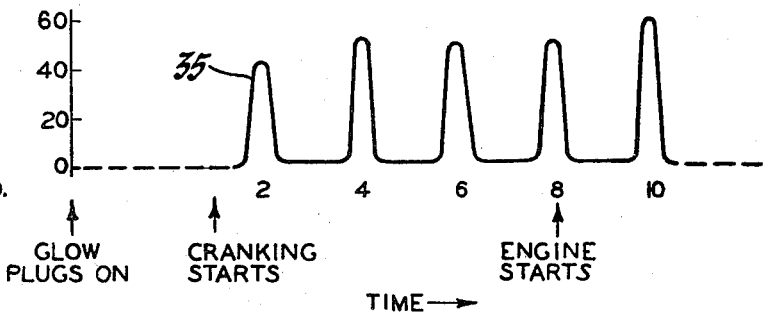
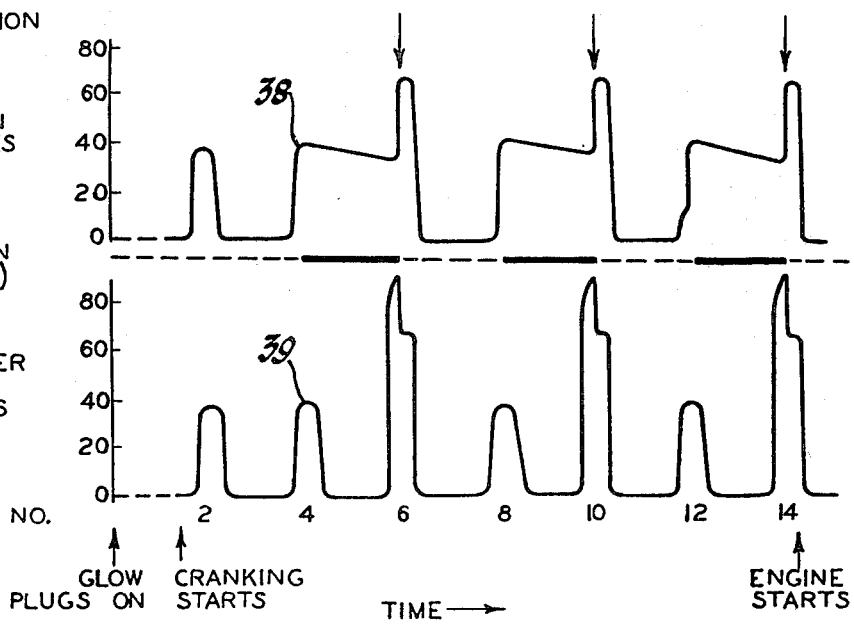
Fig. 5

VALVED PRECHAMBER DIESEL ENGINE AND METHOD OF OPERATING

TECHNICAL FIELD

This invention relates to prechamber type (indirect injection) diesel engines and more particularly to such engines having prechamber cutoff valves and methods of operation thereof.

BACKGROUND

It is known in the field of indirect injection (prechamber type) diesel engines to provide a relatively high compression ratio of around 20 or 22 to 1 in order to assure proper starting and running of the engine, especially under cold operating conditions. A glow plug, which is commonly electrically heated, is usually provided to assist vaporization of fuel for starting when the engine is cold.

It is also known to provide for exhaust gas recirculation in order to limit the formation of oxides of nitrogen in the high temperature combustion process of the diesel engine. Such recirculation is generally provided by conducting exhaust gases from the engine exhaust system into the induction system, for example at the intake manifold.

It is further believed that the relatively higher compression ratios of prechamber diesel engines encourage the formation of nitrogen oxides and particulates as well as causing higher friction losses as compared to engines operating at lower compression ratios.

SUMMARY OF THE INVENTION

The present invention involves substantial modifications of conventional prechamber type diesel engines, modifications which may be employed concurrently or individually in conjunction with certain novel operating methods to provide simplified exhaust gas dilution for $NO_x$ control, and/or reduced engine friction with improved efficiency and reductions in $NO_x$ and particulate formation. Some of these advantages are provided by incorporating cutoff valves which can be cyclically operated during engine operation to cut off communication between the prechamber and the main combustion chamber of each engine cylinder during predetermined portions of the engine cycle.

Novel methods of operation of engines with such cutoff valves are included in this invention to provide (1) internal stratified exhaust gas dilution during normal running and (2) increased combustion chamber pressure for starting above that provided by the nominal compression ratio in normal running. The latter feature permits reduction of the overall engine nominal compression ratio from the usual value of around 22 to 1 to a reduced value of, for example, 17 to 1 or less, permitting operation under normal operating conditions with reduced engine friction and improved efficiency.

One of the novel operating methods included in this invention to provide internal stratified exhaust gas dilution involves closing the prechamber cutoff valve for each cylinder near the end of its respective expansion stroke to trap exhaust gases in the prechamber. The valve remains closed during the subsequent exhaust and intake strokes and is again opened during the compression stroke to permit some of the fresh air charge in the cylinder to be compressed into the prechamber for mixing with the retained exhaust gases. Upon subsequent injection of fuel into the prechamber, combustion begins in the dilute mixture of air and exhaust gas compressed therein after which the mixture is in part carried into the main combustion chamber for further mixing with the fresh air charge and combustion of the remaining fuel therein. This method permits retaining substantial amounts of exhaust gases in the prechamber, the retained volume being adjustable by varying the timing of closing of the cutoff valves on the expansion stroke. The method further provides for stratification or segregation of the retained exhaust gases primarily in the prechamber, where combustion begins, for more effective reduction of nitrogen oxides formation. Finally, the arrangement may avoid the need for conduits external to the cylinder associated with conventional exhaust gas recirculation methods.

A second novel method forming a part of the present invention permits increasing the compression ratio in the combustion chamber during starting so as to provide adequate gas temperatures in the prechamber for ignition of the injected fuel charge under cold starting and operating conditions, while allowing the engine to be operated at a reduced nominal compression ratio for normal operation after warm up, thereby providing the advantages of lower friction and improved operating efficiency as well as reduced formation of oxides of nitrogen and particulates.

These and other features and advantages of the invention will be more fully understood from the following description of certain preferred embodiments and methods in accordance with the present invention taken together with the accompanying drawings.

BRIEF DRAWING DESCRIPTION

In the drawings:

FIG. 1 is a fragmentary cross-sectional view of an internal combustion engine of the diesel prechamber type, showing the arrangement of a prechamber cutoff valve formed in accordance with the invention;

FIG. 2 is a cross-sectional view similar to FIG. 1 but showing an alternative embodiment of cutoff valve in accordance with the invention;

FIG. 3 is a cross-sectional view from the plane indicated by the line 3—3 of FIG. 2;

FIG. 4 is a graphical illustration of prechamber and main chamber pressures during starting of a conventional prechamber type diesel engine, and FIG. 5 is a graphical illustration of prechamber and main chamber pressures during starting of a valved prechamber engine operated in accordance with the novel starting method of the present invention.

DETAILED DESCRIPTION

Referring now in detail to FIG. 1 of the drawings, numeral 10 generally indicates a diesel engine formed in accordance with the invention. Engine 10 includes a cylinder block 11 having a plurality of cylinders 12, only one of which is shown. A piston 14 is reciprocably disposed in each of the cylinders, the ends of which are closed by a cylinder head 15 to define together with the piston a variable volume main combustion chamber 16.

The cylinder head contains the usual inlet and exhaust ports controlled by poppet valves, not shown, to provide for the admission of air to and the exhaust of burned products from the main combustion chamber. In addition, the cylinder head defines a fixed volume prechamber 18 which is connected with the main chamber by a restricted passage or throat 19. An injection nozzle 20 mounted in the cylinder head is arranged to spray charges of atomized fuel directly into the prechamber. A glow plug 22 carried by the head extends into the prechamber for use in assisting the vaporization and ignition of fuel sprayed during cold engine starting and operation.

In accordance with the present invention, engine 10 is also provided with a prechamber cutoff valve 23, which is mounted in the cylinder head and includes an enlarged head 24. Reciprocation of the valve stem moves the head from a retracted position in a recess 26 adjacent to the throat 19 to an extended position in which the head 24 engages a seat 27 on the opposite side of the throat and closes the passage defined by the throat 19 to communication between the prechamber 18 and the main combustion chamber 16.

In operation, the engine components and the cutoff valve are actuated in predetermined cyclic relationships to be subsequently more fully discussed by conventional actuating means not shown. Reciprocation of the cutoff valve in timed relationship with the other engine components may be accomplished by purely mechanical means if desired. Alternatively, however, electronically controlled actuators may be utilized. Whatever mechanism or control system is employed, it may be desirable to provide means for modifying the timing of cutoff valve actuation, as well as providing for varying the cyclic relationships of the valve operation with respect to other engine components for use in accomplishing various methods of engine operation to be subsequently more fully described.

Typically in prechamber diesel engines of conventional construction, the volume of the prechamber represents about one half the total clearance volume of the cylinder when the piston is at its top dead center position and the main combustion chamber volume is a minimum. Variations are possible, however, and it is considered within the scope of the present invention that the fixed volume of the prechamber and the minimum volume of the variable volume main combustion chamber be sized to each represent not less than about one quarter of the total piston clearance volume at top dead center.

Also for certain purposes, the overall compression ratio of the engine may be selected within any reasonable operating range. Thus, it is possible to operate an engine according to the invention on a conventional prechamber diesel engine compression ratio in the neighborhood of 20 or 22 to 1. It is also within the scope of the invention, and represents an advantageous mode of operation for one of the operating methods to be subsequently described, to provide the engine with a reduced overall compression ratio which may, for example, be in the neighborhood of 17 to 1 or at any suitable reduced compression ratio at which operation on compression ignition can satisfactorily be provided.

Alternative Embodiments

It should be recognized that the construction of the prechamber cutoff valve provided in the engine embodiment illustrated in FIG. 1 is representative of only one form of cutoff valve construction applicable to engines in accordance with the invention. In FIGS. 2 and 3 of the drawings, an alternative embodiment of cutoff valve is illustrated as applied to an engine in accordance with the present invention. Since the majority of the components are identical with those illustrated in FIG. 1, like numerals have been utilized for like parts.

The cutoff valve of FIGS. 2 and 3 includes a shaft 30 which is mounted in the cylinder head for rotational oscillation about a longitudinal axis. A gate 31, offset from the rotational axis, extends downwardly from the lower end of the shaft 30. In the open position of the valve, the gate 31 resides in a recess 32 of the cylinder head provided on one side of the passage defined by the throat 19, thus permitting the free flow of gases between the prechamber 18 and the variable volume main combustion chamber 16. The valve is closed by rotating the shaft 30 one-quarter turn to move the gate 31 into a position engaging the far wall of the throat and extending there across to block the passage of gas through the throat between the prechamber and the main combustion chamber. As in the previous embodiment, operation of the cutoff valve of FIGS. 2 and 3 may be by any suitable means such as mechanical or electrical actuators to accomplish the purposes desired.

Methods of Engine Operation

It should be understood that valved prechamber diesel engines as previously described or as may otherwise be formed in accordance with the present invention may be operated in accordance with various methods utilized individually or alternatively. Included among various possible operating schemes are methods forming a part of the present invention including a method for operating with internal stratified prechamber exhaust gas dilution and a method for cold engine starting and running with relatively low overall engine compression ratios.

Internal Exhaust Dilution

A valved prechamber diesel engine according to the present invention may be operated in a novel manner to provide internal exhaust gas dilution of the prechamber charge. The operating method includes the following steps.

1. Contracting the main combustion chamber to compress a charge of air in the cylinder, the cutoff valve being opened at some time during the compression stroke.

2. Maintaining the valve open while injecting a charge of fuel into the prechamber for ignition and burning in the compressed air charge and then expanding the main chamber to develop power.

3. Closing the valve at some point in and preferably near the end of the expansion step to retain a portion of the burned charge in the prechamber.

4. Maintaining the valve closed while forcing the remainder of the burned charge from the main combustion chamber by contracting the chamber on the exhaust stroke and admitting a fresh air charge to the main combustion chamber during subsequent expansion thereof.

5. Contracting the main combustion chamber and opening the valve to compress the fresh charge and force a portion thereof into the prechamber for mixing with the retained portion of the previous burned charge to form a dilute charge.

6. Injecting a charge of fuel into the prechamber for ignition and burning in the dilute charge and mixing with the fresh charge in the main chamber for completion of combustion, and expanding the combustion chamber to develop power.

7. Thereafter, cyclically repeating steps 3 through 6 whereby the formation of nitrogen oxides in the combustion gases is minimized by lower combustion temperatures resulting from the diluting effect of the exhaust gases retained in the prechamber after each expansion step.

In operating according to the internal gas dilution method, the amount of retained exhaust gas and its pressure will be determined by the timing of the closing of the cutoff valve during the piston expansion stroke. Also, by proper selection of the timing of opening the cutoff valve on the piston compression stroke, the stratification or segregation of retained exhaust gas in the prechamber or its partial escape into the main chamber may be controlled.

If the valve is held closed until the compression pressure in the main chamber equals or exceeds the pressure of retained exhaust gas in the prechamber, then all of the retained gas will remain in the prechamber to mix with the fresh charge compressed therein on the remainder of the piston compression stroke. However, opening of the prechamber valve near the beginning of the compression stroke may allow some of the retained exhaust gas to escape from the prechamber into the main chamber for mixing with the fresh charge, reducing the stratification of the retained exhaust in the prechamber as compared to that in the main chamber charge.

Operation with internal exhaust gas retention may avoid the necessity for external exhaust gas recirculation (EGR) means by providing the necessary diluent internally to minimize oxides of nitrogen formation by maintaining lower combustion temperatures in the burning gases, particularly during the initial combustion in the prechamber where the amount of retained exhaust gas will be the greatest. This operating method may be utilized under any desired condition of overall engine compression ratio with which it may be desired and practical to operate.

Low Compression Starting Method

In another advantageous use of engines in accordance with the present invention, a valved prechamber diesel may be operated with a reduced compression ratio, such as for example in the neighborhood of 17 to 1 or possibly even lower. Such low compression ratio operation has the advantage of reducing cylinder compression and combustion pressures, which reduces bearing loads and the resulting friction, so that more efficient operation of the engine should be possible. At some point, however, it is apparent that reduction of the overall engine compression ratio will result in difficulty in starting and operating a cold engine. Under such conditions, the heat loss to the main chamber and prechamber walls may be sufficient to interfere with reaching temperatures in the prechamber adequate for practical compression ignition of the charge.

To remedy this, starting and warm-up may be aided by operating engines according to the present invention in a manner that provides, on alternate operating cycles, compression pressures in the main and precombustion chambers substantially higher than the nominal overall compression ratio would otherwise provide. This may be accomplished by a method including the following steps.

1. Admitting a charge of air to the main combustion chamber (such as by expansion thereof) and subsequently contracting the main combustion chamber to compress the fresh charge into the clearance volume comprising the main combustion chamber and the prechamber.

2. Closing the cutoff valve to retain in the prechamber the portion of the charge compressed therein.

3. Maintaining the valve closed during discharge (such as by expansion and exhaust) of the remaining charge in the main combustion chamber, the admission of a second fresh charge to the main combustion chamber and the subsequent at least partial compression of the second charge.

4. Fully compressing the second charge and opening the cutoff valve to combine the compressed second fresh charge with the retained compressed prechamber charge to provide a higher pressure in the prechamber sufficient for compression ignition.

5. Injecting a charge of fuel into the prechamber for ignition and burning and expanding the main combustion chamber to develop power.

6. Exhausting the burned gases and repeating the previous steps for a sufficient number of cycles to allow normal running of the engine with compression ignition in the prechamber at the established engine compression ratio.

It should be noted that the timing of closing the cutoff valve must be relatively precise at a point shortly after the piston reaches its top dead center position on alternate compression strokes so as to trap in the prechamber the maximum charge pressure reached therein for retention until the subsequent cycle. The opening of the valve on the subsequent cycle may be less precisely accomplished since the results will be approximately the same as long as the valve is opened after the beginning of the compression stroke following closing of the valve and before the injection of fuel. Preferably, however, to avoid losses due to excessive gas transfer, it appears advisable that the valve opening timing be such as to occur after compression of the subsequent charge in the main chamber reaches a pressure that at least equals the pressure of the retained gases in the prechamber, so that reverse flow from the prechamber to the main chamber and then back again is not occasioned.

FIGS. 4 and 5 illustrate the corresponding prechamber and main chamber pressures in conventional engines as compared to those according to the invention. FIG. 4 represents chamber pressures in a conventional 22 to 1 compression ratio prechamber engine, line 34 representing the prechamber pressure in atmospheres and line 35 representing the main chamber pressure in atmospheres. It is seen that the compression pressures reached are essentially the same in both chambers at each cycle of the conventional engine.

FIG. 5 represents the compression pressures reached in a valved prechamber engine according to the invention having 17.5 to 1 compression ratio when operated according to the low compression ratio starting method previously set forth. In this figure, line 38 represents prechamber pressure in atmospheres while line 39 represents the main chamber pressure.

During cranking, the prechamber cutoff valve is open until the peak of the compression stroke at revolution four. Then it closes, trapping pressure at about 40 atmospheres in the prechamber. On the next compression stroke, pressure in the main chamber rises to about 96 atmospheres because the cutoff valve is still closed and the effective compression ratio in the main chamber is therefore increased to about 35 to 1. At the peak of this compression stroke, at revolution six, the cutoff valve is opened and the pressures in the main chamber at 96 atmospheres and the prechamber pressure at 40 atmospheres equalize at about 67 atmospheres. At this point, fuel is injected which should ignite since the peak pressure at this point exceeds, or at least equals, that in a conventional 22 to 1 compression ratio engine at starting.

It should be apparent that with this operating method the engine is fired only at every other compression stroke. Thus at some point after the combustion chamber is sufficiently warm, the action of the cutoff valve would be stopped and operation would revert to the conventional arrangement of injecting fuel every compression stroke on the overall low compression operating mode.

While certain portions of the specification have been directed primarily to engines of the four stroke cycle type, it is to be understood that the inventive concepts and methods disclosed may be equally well applied to two stroke cycle engines or engines operable on other cycles. Further, while the invention has been described by reference to certain engine embodiments and operating methods all of which are included within the scope of the present invention, it should be understood that numerous changes could be made within the scope and spirit of the inventive concepts described. Accordingly, it is intended that the invention not be limited to the disclosed embodiments and methods but that it have the full scope permitted by the language of the following claims.

The embodiments of the invention in which an exclusive property or privilege is claimed are defined as follows.

1. The method of operating for starting and warming up a low compression indirect injection compression ignition internal combustion engine having a variable volume main combustion chamber connected by a throat to a prechamber into which fuel is injected for burning to develop power and having a valve operative to close or open the throat to permit or prevent communication between the prechamber and the main combustion chamber, wherein said chambers each form at least one quarter of the total cylinder clearance volume, said method comprising the steps of admitting a charge of air to the main combustion chamber and subsequently contracting the main combustion chamber to compress the fresh charge into the clearance volume comprising the main combustion chamber and the prechamber, closing the valve to retain in the prechamber the portion of the charge compressed therein, maintaining the valve closed while expanding and discharging the remaining charge portion in the main combustion chamber, admitting a second fresh charge and at least beginning its compression in the main combustion chamber, fully compressing the second fresh charge and opening the valve to combine the compressed second fresh charge in the main combustion chamber with the retained compressed charge in the prechamber to provide an increased pressure in the prechamber sufficient for compression ignition, injecting a charge of fuel into the prechamber for ignition and burning, expanding the main combustion chamber to develop power, exhausting the burned gases, and repeating the foregoing steps for a sufficient number of cycles to allow normal running of the engine with compression ignition in the prechamber at the established low engine compression ratio.

2. The method of operating for starting and warming up a low compression indirect injection compression ignition internal combustion engine having a variable volume main combustion chamber connected by a throat to a prechamber into which fuel is injected for burning to develop power and having a valve operative to close or open the throat to permit or prevent communication between the prechamber and the main combustion chamber, wherein said chambers each form at least one quarter of the total cylinder clearance volume, said method comprising the steps of admitting a charge of air to the main combustion chamber and subsequently contracting the main combustion chamber to compress the fresh charge into the clearance volume comprising the main combustion chamber and the prechamber, closing the valve to retain in the prechamber the portion of the charge compressed therein, maintaining the valve closed while expanding and discharging the remaining charge portion in the main combustion chamber, admitting a second fresh charge and compressing said second fresh charge to a higher pressure in the main combustion chamber, opening the valve to combine the more highly compressed second fresh charge in the main combustion chamber with the retained compressed charge in the prechamber to provide an increased pressure in the prechamber sufficient for compression ignition, injecting a charge of fuel into the prechamber for ignition and burning, expanding the main combustion chamber to develop power, exhausting the burned gases, and repeating the foregoing steps for a sufficient number of cycles to allow normal running of the engine with compression ignition in the prechamber at the established low engine compression ratio.

3. The method of operating for starting and warming up a low compression indirect injection four stroke cycle compression ignition internal combustion engine having a variable volume main combustion chamber connected by a throat to a prechamber into which fuel is injected for burning to develop power and having a valve operative to close or open the throat to permit or prevent communication between the prechamber and the main combustion chamber, wherein said chambers each form at least one quarter of the total cylinder clearance volume, said method comprising the steps of expanding the main combustion chamber while admitting a charge of air thereto and subsequently contracting the main combustion chamber to compress the fresh charge into the clearance volume comprising the main combustion chamber and the prechamber, closing the valve to retain in the prechamber the portion of the charge compressed therein, maintaining the valve closed while expanding the main combustion chamber and the charge portion remaining therein, contracting the main chamber to discharge such remaining charge, expanding the main chamber while admitting a second fresh charge and again contracting the main chamber to compress said second fresh charge to a higher pressure, opening the valve to combine the more highly compressed fresh charge in the main combustion chamber with the retained compressed charge in the prechamber to provide an increased pressure in the prechamber sufficient for compression ignition, injecting a charge of fuel into the prechamber for ignition and burning, expanding the main combustion chamber to develop power, contracting the main combustion chamber to discharge the burned gases, and repeating the foregoing steps for a sufficient number of cycles to allow normal running of the engine with compression ignition in the prechamber at the established low engine compression ratio.

* * * * *